United States Patent
Georgiev

(10) Patent No.: US 8,041,140 B1
(45) Date of Patent: *Oct. 18, 2011

(54) HEALING BY TEXTURE SYNTHESIS IN DIFFERENTIAL SPACE

(75) Inventor: Todor G. Georgiev, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/498,897

(22) Filed: Jul. 7, 2009

Related U.S. Application Data

(63) Continuation of application No. 10/748,013, filed on Dec. 30, 2003, now Pat. No. 7,558,433.

(51) Int. Cl.
*G06K 9/40* (2006.01)
*G06K 9/36* (2006.01)
*G06K 9/00* (2006.01)

(52) U.S. Cl. .................................... 382/254; 382/284

(58) Field of Classification Search .................. 382/108, 382/162, 164, 173, 199, 203, 218, 219, 254, 382/268, 272, 274–277, 282, 289, 294; 345/470, 345/473, 581; 358/3.26, 3.27, 452, 453, 358/531, 572
See application file for complete search history.

(56) References Cited

U.S. PATENT DOCUMENTS

| | | | |
|---|---|---|---|
| 5,715,334 A | 2/1998 | Peters | |
| 5,850,471 A | 12/1998 | Brett | |
| 5,898,464 A | 4/1999 | Cho | |
| 5,999,194 A * | 12/1999 | Brunelle | 345/473 |
| 6,031,928 A * | 2/2000 | Scott | 382/108 |
| 6,266,054 B1 | 7/2001 | Lawton et al. | |
| 6,437,808 B1 * | 8/2002 | Brill et al. | 715/765 |
| 6,529,638 B1 | 3/2003 | Westerman | |
| 6,587,592 B2 | 7/2003 | Georgiev et al. | |
| 6,593,933 B1 | 7/2003 | Xu et al. | |
| 6,674,902 B1 * | 1/2004 | Kondo et al. | 382/199 |
| 6,674,905 B1 | 1/2004 | Matsugu et al. | |

(Continued)

FOREIGN PATENT DOCUMENTS

EP 0 784 293 7/1997

(Continued)

OTHER PUBLICATIONS

Marcelo Bertalmio et al, Image Inpainting, Proceedings of SIGGRAPH 2000, New Orleans, USA. Jul. 2000, pp. 1-11.

(Continued)

*Primary Examiner* — Amir Alavi
(74) *Attorney, Agent, or Firm* — Fish & Richardson P.C.

(57) ABSTRACT

Techniques for modifying an image may be applied to heal texture areas within the image. A region to be healed in an original image may be identified, and a differential representation may be calculated for at least a portion of a texture source image that provides sample texture. Samples of the texture source image differential representation may be copied to a location corresponding to the identified modification region to generate a new differential representation for the modification region. The new differential representation for the modification region may be integrated to produce a modified image. In some implementations, a differential representation may be calculated of boundary pixels that are outside of and adjacent to the region to be healed in the original image. Copying samples of the texture source image differential representation may be performed so as to obtain substantial smoothness between the copied samples and the differential boundary pixel values.

25 Claims, 12 Drawing Sheets

U.S. PATENT DOCUMENTS

| | | | |
|---|---|---|---|
| 6,985,263 B2 | 1/2006 | Georgiev et al. | |
| 7,039,222 B2 * | 5/2006 | Simon et al. | 382/118 |
| 7,076,099 B2 * | 7/2006 | Kondo et al. | 382/203 |
| 7,248,745 B1 | 7/2007 | Georgiev et al. | |
| 7,558,433 B1 * | 7/2009 | Georgiev | 382/254 |
| 7,577,313 B1 * | 8/2009 | Georgiev | 382/284 |
| 7,760,956 B2 * | 7/2010 | Lin et al. | 382/254 |

FOREIGN PATENT DOCUMENTS

| | | |
|---|---|---|
| JP | 9083805 | 3/1997 |
| JP | 11032224 | 2/1999 |
| JP | 11154227 | 6/1999 |
| JP | 2000187728 | 7/2000 |
| JP | 2000251053 | 9/2000 |
| JP | 2001022923 | 1/2001 |
| JP | 2001036731 | 2/2001 |
| JP | 2001238136 | 8/2001 |
| WO | WO 97/06477 | 2/1997 |

OTHER PUBLICATIONS

William L. Briggs, "A Multigrid Tutorial", copyright 1987; chapter 1-3, pp. 1-50.

Anil N. Hirani et al, "Combining Frequency and Spatial Domain Information for Fast Interactive Image Noise Removal". Proceedings of SIGGRAPH 96 (New Orleans, LA, Aug. 4-9, 1996). In *Computer Graphics* Proceedings, Annual Conference Series, 1996, *ACM SIGGRAPH*, pp. 269-276.

Homan Igehy et al, "Image Replacement Through Texture Sythesis", *Proceedings of the 1997 IEEE International Conference on Image Processing*, pp. 186-189.

Manuel M. Oliveira, "Fast Digital Image Inpainting", Proceedings of the International Conference on Visualization, Imaging and Image Processor (VIIP 2001), Marbella, Spain, Sep. 3-5, 2001, pp. 261-266.

Supplementary Partial European Search Report, European Application No. 02803623.4-2218, Sep. 19, 2006, pp. 1-4.

C. Ballester et al., A Variational Model for Filling-In Gray Level and Color Images, Proceedings of the Eight IEEE International Conference on Computer Vision, Jul. 7-14, 2001, vol. 1, of 2. Conf. 8, XP010553957, pp. 10-16.

C. Ballester et al., Filling-In by Joint Interpolation of Vector Fields and Gray Levels, IEEE Transactions on Image Processing, Aug. 8, 2001, vol. 10, XP011025817, pp. 1200-1211.

Supplementary European Search Report, European Application No. 02803623.4-2218, Oct. 30, 2006, pp. 1-7.

Alexei A. Efros et al., Texture Synthesis by Non-parametric Sampling, 1999 IEEE, pp. 1033-1038.

Li-Yi Wei et al., Fast Texture Synthesis using Tree-structured Vector Quantization, Computer Graphics Proceedings, Annual Conference Series, 2000, XP001003589, pp. 479-488.

European Communication pursuant to Article 96(2) EPC, European Application No. 02803623.4-1522, Mar. 23, 2007, pp. 1-4.

Alexei A. Efros and Thomas K. Leung, *"Texture Synthesis by Non-parametric Sampling,"* IEEE International Conference on Computer Vision, Corfu, Greece, pp. 6, Sep. 1999.

Patrick Perez, Michel Gangnet, and Andrew Blake, *"Poisson Image Editing,"* pp. 313-318, 2003.

Li-Yi Wei and Marc Levoy, *"Fast Texture Synthesis using Tree-structured Vector Quantization."* pp. 1-10.

Iddo Drori, Daniel Cohen-Or, and Hezy Yeshurun, *"Fragment-Based Image Completion,"* pp. 303-312, 2003.

Marcelo Bertalmio, *Simultaneous Structure and Texture Image Inpainting*, pp. 1-13.

Translation of Office Action dated Jun. 15, 2009 received in Japanese Patent Application No. 2003-546301, 4 pages.

Kumio Yamada, "New Photoshop Technical Guide," *Professional DTP 1999*, 11, Japan, K.K. Kogakusha, Nov. 1, 1999, 8 pages.

C. Ballester, et al., "A Variation Model for Filling-In Gray Level and Color Images," *Computer Vision*, 2001, ICCV 2001, Proceedings, Eighth IEEE International Conference on Jul. 7, 2001, vol. 1, pp. 10-16, with Abstract translation, 7 pages.

\* cited by examiner

| 0 | 0 | -1 | 0 | 0 |
|---|---|---|---|---|
| 0 | -2 | 8 | -2 | 4 |
| -1 | 8 | 12 | 8 | -1 |
| 0 | -2 | 8 | -2 | 0 |
| 0 | 0 | -1 | 0 | 0 |

520

Kernel Divisor=32

| 0 | 1 | 0 |
|---|---|---|
| 1 | 0 | 1 |
| 0 | 1 | 0 |

510

Kernel Divisor=4

| 0 | 0 | 0 | 1 | 0 | 0 | 0 |
|---|---|---|---|---|---|---|
| 0 | 0 | 3 | -12 | 3 | 0 | 0 |
| 0 | 3 | -24 | 57 | -24 | 3 | 0 |
| 1 | -12 | 57 | 144 | 57 | -12 | 1 |
| 0 | 3 | -24 | 57 | -24 | 3 | 0 |
| 0 | 0 | 3 | -12 | 3 | 0 | 0 |
| 0 | 0 | 0 | 1 | 0 | 0 | 0 |

530

Kernel Divisor=256

| 0 | 0 | 0 | 0 | -1 | 0 | 0 | 0 | 0 |
|---|---|---|---|---|---|---|---|---|
| 0 | 0 | 0 | -4 | 16 | -4 | 0 | 0 | 0 |
| 0 | 0 | -6 | 48 | -112 | 48 | -6 | 0 | 0 |
| 0 | -4 | 48 | -216 | 400 | -216 | 48 | -4 | 0 |
| -1 | 16 | -112 | 400 | 1372 | 400 | -112 | 16 | -1 |
| 0 | -4 | 48 | -216 | 400 | -216 | 48 | -4 | 0 |
| 0 | 0 | -6 | 48 | -112 | 48 | -6 | 0 | 0 |
| 0 | 0 | 0 | -4 | 16 | -4 | 0 | 0 | 0 |
| 0 | 0 | 0 | 0 | -1 | 0 | 0 | 0 | 0 |

540

Kernel Divisor=2048

*FIG. 5*

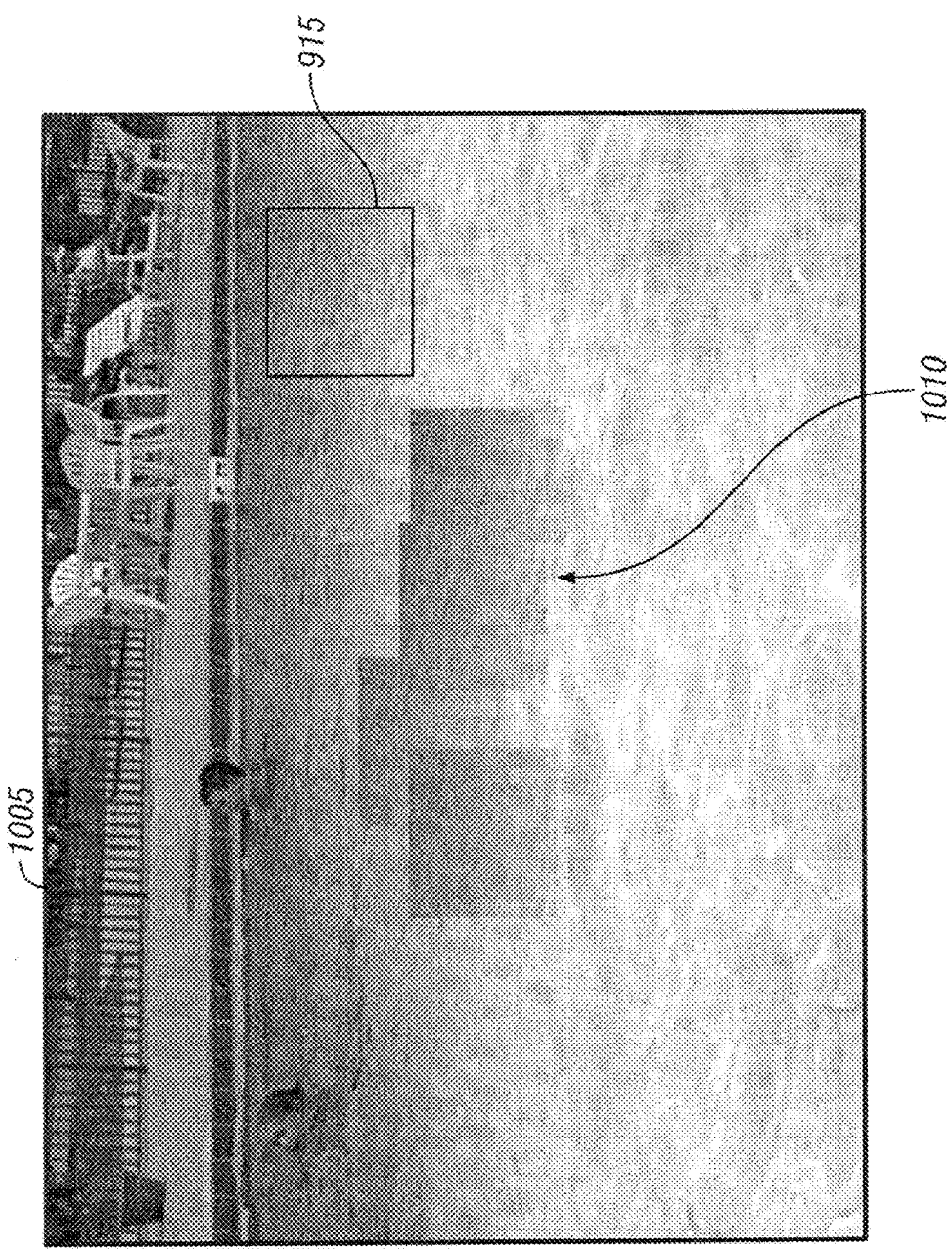

HEALING BY TEXTURE SYNTHESIS IN DIFFERENTIAL SPACE

CLAIM OF PRIORITY

This application is a continuation (and claims the benefit of priority under 35 USC 120) of U.S. application Ser. No. 10/748,013, filed Dec. 30, 2003 now U.S. Pat. No. 7,558,433. The disclosure of the prior application is considered part of (and is incorporated by reference in) the disclosure of this application.

TECHNICAL FIELD

This description relates to generating new data values for an image region, for example, generating replacement data values to heal defective pixels using boundary conditions and/or using a sample of textured data values.

BACKGROUND

Traditional techniques for removing unwanted features from images include wire removal techniques such as are used in movies, dust and scratches filters used in software applications such as PHOTOSHOP®, provided by Adobe Systems, Inc. of San Jose, Calif., inpainting, and other algorithms. In typical replacement pixel data generation techniques, selected pixels in an image are regenerated based on values of the pixels bordering the selected pixels and on first and second order partial differential equations (e.g., the Laplace equation). For example, traditional inpainting techniques generally are based on second order the Laplace equation and/or anisotropic diffusion. These techniques often result in noticeable discontinuities at the edges of the inpainted region.

Other techniques of generating replacement data values in an image region include applying area operations such as blurring or performing median calculations (e.g., using Gaussian filters and median filters) at each pixel in the selected region. The image area, or neighborhood, used for the area operation generally will include one or more selected pixels with undesirable data values. Thus, the neighborhood needs to be large enough to swamp the contributions of the undesirable pixel data. Oftentimes, a user must specify how large to make the neighborhood to minimize the effects of the undesirable data values. For example, techniques that are based on frequency domain separations generally require that the user specify a neighborhood size that will be used by the filter that separates gross details from fine details.

Some conventional techniques also apply a high-frequency component from another image to a healed region after it has been modified to replace defective pixel values. But the results of such traditional techniques for removing unwanted features of an image often do not reflect the true properties of most images. Areas of images that are filled-in using conventional techniques frequently have discontinuities at the boundary of the filled-in region and/or look blurred or otherwise appear to lack detail. These filled-in areas are often easily noticed and do not look like a natural part of the image, either because the surrounding areas are textured, or because pixel intensity changes sharply at the boundary of each filled-in area.

Another technique for generating data values for an image is texture synthesis. Texture synthesis algorithms synthesize new texture based on sample texture by simply copying pixels from the sample texture to a new location so they match the texture pattern. As a result, a potentially unlimited area of new texture may be "grown" from a small "seed" of sample texture. One example of a texture synthesis algorithm is the Pattern Maker feature in PHOTOSHOP® image editing software. Because texture synthesis techniques essentially grow texture from an existing texture image outward, such techniques are useful for growing an object bigger. If texture synthesis is used to fill in an area within an existing image, however, colors typically do not match at some of the boundaries between the existing image and the synthesized texture or where two regions of synthesized texture meet.

Traditional techniques for modifying images also include image enhancement techniques used to address recurring visual anomalies, such as by obtaining dynamic range compression. Land's "Retinex" theory has been used in a number of image enhancement techniques that apply a defined modification to an image to address dynamic range and color constancy issues. Defined techniques for adjusting shadow and highlight detail in images are also available. For example, one technique can assist in removing shadows from images and involves duplicating, blurring and inverting an image, followed by combining the image with the original image in Color Dodge mode in PHOTOSHOP® software. Although the sequence of steps in this technique may be considered relatively strange, they can produce useful results in adjusting shadow and highlight detail in images.

SUMMARY

Techniques may be employed for removing unwanted features from images. The techniques may provide replacement texture that provides both consistent texture and color at the boundaries between the replacement image regions and the original image. Such an ability may be provided by generating replacement texture (i.e., performing texture synthesis) in differential space. The resulting differential texture representation is then integrated, using the original image pixel values to provide boundary conditions, to produce the replacement image region.

The essence of texture is in the differential space representation, rather than in the pixel values. By performing texture synthesis in differential space, replacement texture is generated in a more natural and less complicated manner. Then, a Poisson equation is solved using the differential space representation of the texture as a source term and the original pixel values at the boundary of the replacement texture region as a boundary condition. The solution of the Poisson equation brings the replacement texture back to a normal pixel representation, while at the same time generating a healed image.

In one general aspect, a method for generating a modified image may include receiving an identification of a modification region in an original image. A differential representation of at least a portion of a texture source image may be calculated, and samples of the texture source image differential representation may be copied to a location corresponding to the identified modification region to generate a new differential representation for the modification region. The new differential representation may be integrated to produce a modified image.

Implementations may include one or more of the following features. For example, the modified image may be used as a replacement for the modification region of the original image. The samples of the texture source image differential representation may be copied to a location within a differential representation of at least a portion of the original image. An identification of the texture source image may be received, and the texture source image may be a portion of the original image or a portion of a different image. Copying samples of the texture source image differential representation to a location corresponding to the identified modification region may involve filling a region corresponding to the identified modification region with samples of the texture source image differential representation. Multiple different samples may be available in the texture source image differential representation. Integrating the new differential representation to produce a modified image may include calculating a solution to a partial differential equation and/or using pixels in a boundary region adjacent to the modification region in the original image to provide boundary conditions for calculating the solution to the partial differential equation.

In some implementations, for purposes of generating the new differential representation, a differential representation of boundary pixels in the original image may be calculated to produce differential boundary pixel values. The boundary pixels are located outside of and adjacent to the modification region. New differential pixel values may be generated for the modification region so as to obtain substantial consistency in average differential pixel values between the differential boundary pixel values and the new differential pixel values, which after integration produces a consistent texture between the boundary pixels and the modified image that replaces the original modification region. The texture source region may be derived from a portion of the original image that overlaps the modification region and/or the boundary pixels. The calculation of a differential representation may involve determining derivatives using a predefined kernel, calculating a multi-channel differential representation, and/or calculating a second or higher order differential representation.

Generating new differential pixel values may involve performing texture synthesis to obtain a substantially consistent texture between the differential boundary pixel values and the new differential pixel values. Performing the texture synthesis may involve using samples from the texture source image differential representation to generate the new differential pixel values starting from the differential boundary pixel values. Integrating the new differential representation to obtain the modified image may be performed by iteratively applying one or more kernels to generate a solution to a partial differential equation having a source term that corresponds to the new differential representation of the modification region. The partial differential equation may be a Poisson differential equation. The Poisson differential equation may be of a form such as $\Delta f = \nabla \cdot s$, $\Delta f = s$, $\Delta \Delta f = \nabla \cdot s$, and $\Delta \Delta f = s$, where s is the source term and corresponds to the synthesized differential representation. The original image may be separated into multiple channels, and calculating the differential representation of the image texture region, calculating the differential representation of the boundary pixels, generating the new differential pixel values, and integrating the new differential pixel values to obtain a modified image may be performed for each of the multiple channels. The image texture region may include multiple areas in the original image.

The integration process may be accelerated by first performing integration at a lower-resolution, The new differential representation has an original resolution. The original-resolution new differential representation of the modification region may be resampled to a lower-resolution new differential representation of the modification region. New lower-resolution pixel values for the modification region may be calculated by iteratively applying one or more kernels to generate a solution to a partial differential equation that corresponds to the lower-resolution new differential representation of the modification region. The new lower-resolution pixel values for the modification region may then be resampled to the original resolution. New original-resolution pixel values for the modification region may be calculated by iteratively applying one or more kernels to generate a solution to a partial differential equation corresponding to the original-resolution new differential representation of the modification region.

In another general aspect, modifying an image may involve receiving an identification of a modification region in an original image and determining a rate of change between pixels across a region of a texture source image. The rate of change may be applied to the modification region, and new pixel values may be determined for the modification region. The new pixel values may exhibit the rate of change and may exhibit consistency with boundary pixel values adjacent to the modification region in the original image.

Each calculated differential representation may be a gradient, a Laplacian, a gradient of the Laplacian, or a second Laplacian. A boundary of a synthesized differential representation may match the boundary of the original image differential representation. The performance of texture synthesis in differential space may involve calculating a Laplacian of the boundary region to produce differential boundary pixel values, calculating a Laplacian of a texture region to produce differential texture pixel values, and selecting samples of the differential texture pixel values for use in generating the synthesized differential representation.

The described techniques may be implemented in a method, in a system, or as a machine-readable medium storing instructions for causing one or more processors to perform the techniques.

The details of one or more implementations are set forth in the accompanying drawings and the description below. Other features will be apparent from the description and drawings, and from the claims.

DESCRIPTION OF DRAWINGS

FIG. 5 is an illustration of example kernels that may be used in solving a differential equation.

FIG. 10 shows an illustrative example of a modified image that is modified according to conventional techniques.

Like reference symbols in the various drawings indicate like elements.

DETAILED DESCRIPTION

Figure 1:
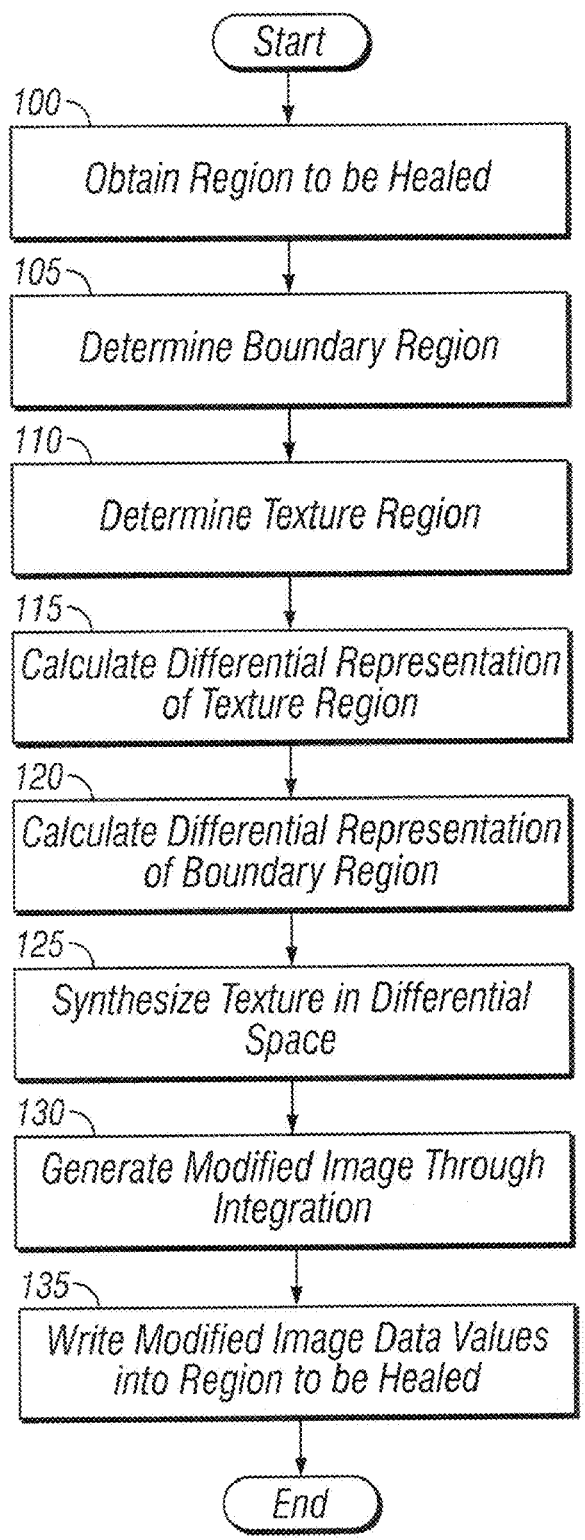
FIG. 1 shows a process for generating new data values for a modification region of an image using data values bounding the modification region and using data values for a texture region.

The systems and techniques described here relate to generating new data values for an image region. These new data values are generated using boundary pixel data values and/or by using a sample of textured data values. These new data values can be written into the image region to heal an image, particularly by generating visual texture to replace an unwanted feature of the image, or can be used as input for further processing. The terms "texture" and "textured" encompass both small-scale and large-scale patterns, ordered and/or repeating patterns, and unordered and/or non-repeating patterns. Texture, in the context of visual images, can relate to surface characteristics of virtually any type of object, for example, as well as many other types of image characteristics, such as light inflections and color inflections. Examples of surfaces or images that may exhibit texture include water, metal, fabric, terrain, clouds, stone, wood, flowers, leaves, and flooring materials. Surfaces may include one or both of small-scale and large-scale textures. For example, individual bricks in a brick wall may have a certain small-scale texture, while the entire brick wall (including the mortar between the individual bricks) may create a larger-scale texture.

The term "heal" means modification of an image to effect a desired change, and generally includes the concept of removing any unwanted feature of an image. Furthermore, the following description frequently discusses image healing in the context of discrete images, which are it) images composed of a finite set of pixel data values (e.g., 24 bit per pixel digital images such those used in RGB (Red, Green, Blue) color systems), but may apply equally in other contexts, including other data bit-to-pixel schemes and other color spaces.

Examples of unwanted image features include artifacts that have arisen through an image capture or storage process (e.g., scratches, dust, or other imperfections that do not correspond to an underlying abstract image) and unwanted elements in an image (e.g., wires in a special effects shot, graffiti, a person or other object that interferes with a desired effect of the image, or any other undesirable feature of an underlying abstract image). The systems and techniques described can be used to remove or alter relatively large elements of an image, thereby serving as a creative tool in addition to a tool for removing small artifacts. In the following description, various operations are described as being performed on, or applied to, an image or portions of an image. In general, these operations can be performed on the image or image portion directly or can be performed on one or more copies of the image or image portion. Under certain circumstances, performance advantages may arise by making one or more copies of an image or image portion and then applying the image processing operations to the copies rather than to the original image directly. When processing is described with respect to an "image," this processing may be performed against an original image, a portion of an original image, a copy of an original image, a copy of a portion of an original image, a portion of a copy of an original image, or additional copies/portions of any of these. When processing is described with respect to an "image copy," this processing alternatively may be performed against the original image.

In healing an area of an image, the ultimate goal may be to generate new pixel data values for a region of the image to be healed (i.e., a modification region). The new pixel data values for the modification region are such that, when written to the modification region, the resulting image is smooth. Smoothness does not imply that the values are continuous across the boundary. Rather, smoothness means that the average pixel values and the average change in pixel values is consistent across the boundary. Thus, the pixel values may change (drastically, in some cases), but the pixel values and the change in pixel values are the same or similar inside the boundary and outside the boundary.

For example, for a multi-channel discrete image, such as an RGB image, smoothness in pixel data values at the boundary can be created for all three channels, thus resulting in similar overall gradations of color and illumination across the boundary of the modification region when the new pixel data values are written into the modification region. The resulting image is noticeably smoother at the boundary of the modification region than may be accomplished by conventional techniques. The description below discusses only the single channel case, but the systems and techniques described below are equally applicable to multi-channel images. Additionally, these systems and techniques can be used with multiple color spaces, either separately or concurrently. For example, an image can be converted into another color space (e.g., an RGB image can be converted to an LUV or a YUV color space), healed in that other color space, and then converted back.

This smoothness at the boundary can be improved by creating more than two orders of consistency at the boundary. This process may be understood mathematically in terms of functions and derivatives of functions. More particularly, the underlying abstract image can be represented mathematically as an image function. Similarly, a portion of the image corresponding to the modification region plus the boundary region also can be represented as an image function. The new pixel data values may be generated such that, when placed in the modification region of the image, the resulting image function corresponding to the modification region plus the boundary region is smooth. Thus the average pixel values for the resulting image function are consistent, the first derivatives of that function are consistent and one or more higher derivatives (second, third, etc.) are consistent. In other words, the new pixel values depend not only on the pixel values at the boundary, but also on multiple higher-order partial derivatives of the pixel values in the boundary region, which may be two or more pixels wide, thereby producing increased smoothness at the boundary. Following generation of the new pixel data values, these data values can be written into the modification region of the image to be healed or used as inputs for further image processing.

FIG. 1 shows a process for generating new data values for a modification region of an image using data values bounding the modification region and using data values for a texture region. In general, the data values may represent pixel values associated with one or more color channels for an image. The process begins by obtaining information defining a modification region of an image to be healed (step 100). The modification region can be a portion of an original digital image that can include a rectangular region within the image, an arbitrarily shaped connected region within the image, or an arbitrarily shaped unconnected region within the image, such as a region specified by a user.

The original image can be a received image, such as image data loaded from a storage device or received over a network or received from an image generating system/device (e.g., a camera or scanner). The original image can be separated into one or more color channels (or other types of channels) for processing. For example, the original image can be separated into RGB components. Each channel can then be treated essentially as a grayscale image with each pixel in the image having a value corresponding to the grayscale or color intensity of that pixel. In the case of a black and white image, the image may be processed in a single grayscale channel.

The modification region may be identified in a number of different manners depending upon the application. For example, a user of a software program can use a brush tool to paint a mask onto the original image, thereby defining the modification region. The brush tool can have clearly defined edges, or it may represent a density function (e.g., the brush may have fuzzy or feathered edges). Alternatively, a user can designate a mask (e.g., using selection tools such as those in PHOTOSHOP® software).

The modification region may also be identified automatically. For example, a feature recognition or statistical analysis can be performed on an original image to identify artifacts or other undesirable features.

Once a mask or other information defining the modification region to be healed is obtained, a boundary region for the modification region is determined (step 105). The boundary region is a set of pixels that bounds the modification region in the original image and extends outward from the modification region at least far enough to support the generation of new pixel data values as discussed below. For example, the boundary region may be a two-pixel deep band surrounding the modification region. In some implementations, the entire original image may be used as the boundary region even though the entire image may not be necessary to perform the healing techniques described below.

Information defining a texture region is also obtained (step 110). The texture region generally includes a representation of a texture to be used in generating the new data values for the modification region. The texture region serves as a source image that defines the desired textural characteristics for the new data values. The texture region may be a portion of the original image that can include one or more rectangular areas within the image, an arbitrarily shaped connected area within the image, or arbitrarily shaped unconnected areas within the image, such as one or more areas specified by a user. The texture region may alternatively or additionally include texture representations that are provided by a separate image or texture region model.

The texture region may be identified in a number of different manners depending upon the application. For example, a user of a software program can use a brush tool to paint a mask onto the original image, thereby defining the texture region. The brush tool can have clearly defined edges or it may represent a density function (e.g., the brush may have fuzzy or feathered edges). Alternatively, a user can designate a mask (e.g., using selection tools such as those in PHOTOSHOP® software). The texture region may also be identified automatically. For example, a feature recognition or statistical analysis can be performed on an original image to identify textures near the boundary of the region to be healed. Thus, the texture region may overlap the boundary region or even portions of the modification region (if such portions do not include the unwanted features).

To perform texture synthesis, a differential representation of the texture region is calculated (step 115), and a differential representation of the boundary region is calculated (step 120). The differential representation of the boundary region may be used to provide better matching between the texture of the boundary region and the texture of the replacement pixel values in the modification region. In some cases, a differential representation of the entire original image may be calculated. The texture region differential representation may be selected from the differential representation of the original image. Moreover, the boundary region differential representation may be provided by those portions of the original image differential representation that border on the modification region. The differential representations may be calculated by applying one or more kernels to the original pixel values. A user can specify the type of differential representation to be used.

In a basic implementation, the differential representation can be a first order differential representation. Optionally, in more complex implementations, a higher-order differential representation of a texture region or boundary region image f can be used. For example, the differential representation can be gradient values ($\nabla f$), Laplacian values ($\Delta f$), gradient of the Laplacian ($\nabla \Delta f$), or second Laplacian ($\Delta \Delta f$) calculated from the texture region or boundary region image. The various differential representations capture changes among pixels of different differential orders, and the user may specify which differential order to use. Alternatively, which differential order is used may be determined automatically (e.g., according to a predetermined setting).

Using the differential representation of the texture region and the differential representation of the boundary region, a texture synthesis algorithm is used to fill in a differential representation of the modification region (step 125). Accordingly, texture synthesis is performed not in the space of image pixels, but in differential space. For example, the differential representation of the texture region is searched to find samples that "match" the differential representation of the boundary region by maintaining a consistent texture at the boundary between the differential representation of the sample texture and the differential representation of the boundary region. The size of the samples may be specified by a user, may be predetermined, or may be determined automatically by analyzing the texture or in accordance with a multi-resolution synthesis process. Examples of texture synthesis algorithms that may be used are described in L. Wei & M. Levoy, "Fast Texture Synthesis Using Tree-Structured Vector Quantization," *Proceedings of SIGGRAPH* 2000, pp. 479-488, July 2000, and A. Efros & T. Leung, "Texture Synthesis by Non-Parametric Sampling," *IEEE Intl Conf. on Computer Vision*, September 1999.

In some implementations, texture synthesis may be performed without calculating a differential representation of the boundary region. In such an implementation, samples of the differential representation of the texture region can be assembled to fill the modification region without concern for precise matching with the boundary region. In many cases, this simplified process can still produce a high-quality healed image.

Next, a modified image is generated from the differential representation of the modification region by solving a Poisson differential equation (step 130). The synthesized texture may be used as a right hand side of the equation, and the original boundary pixel values (from step 105) may be used as Dirichlet boundary conditions (i.e., to ensure that the modified image is consistent in real image space at the boundary). The type of Poisson equation solved and the technique used depend on the differential representation used and the computing resources available. Generating the modified image can involve iteratively applying one or more kernels to the differential representation of the modification region to generate a solution to a Poisson equation, in which the differential representation of the modification region is the source term and the boundary pixel values are used as a boundary condition.

Finally, the modified image is inserted into the modification region of the original image (step 135). The result is an image in which the modified image matches relatively seamlessly with the boundary pixels of the original image.

Figure 2A:
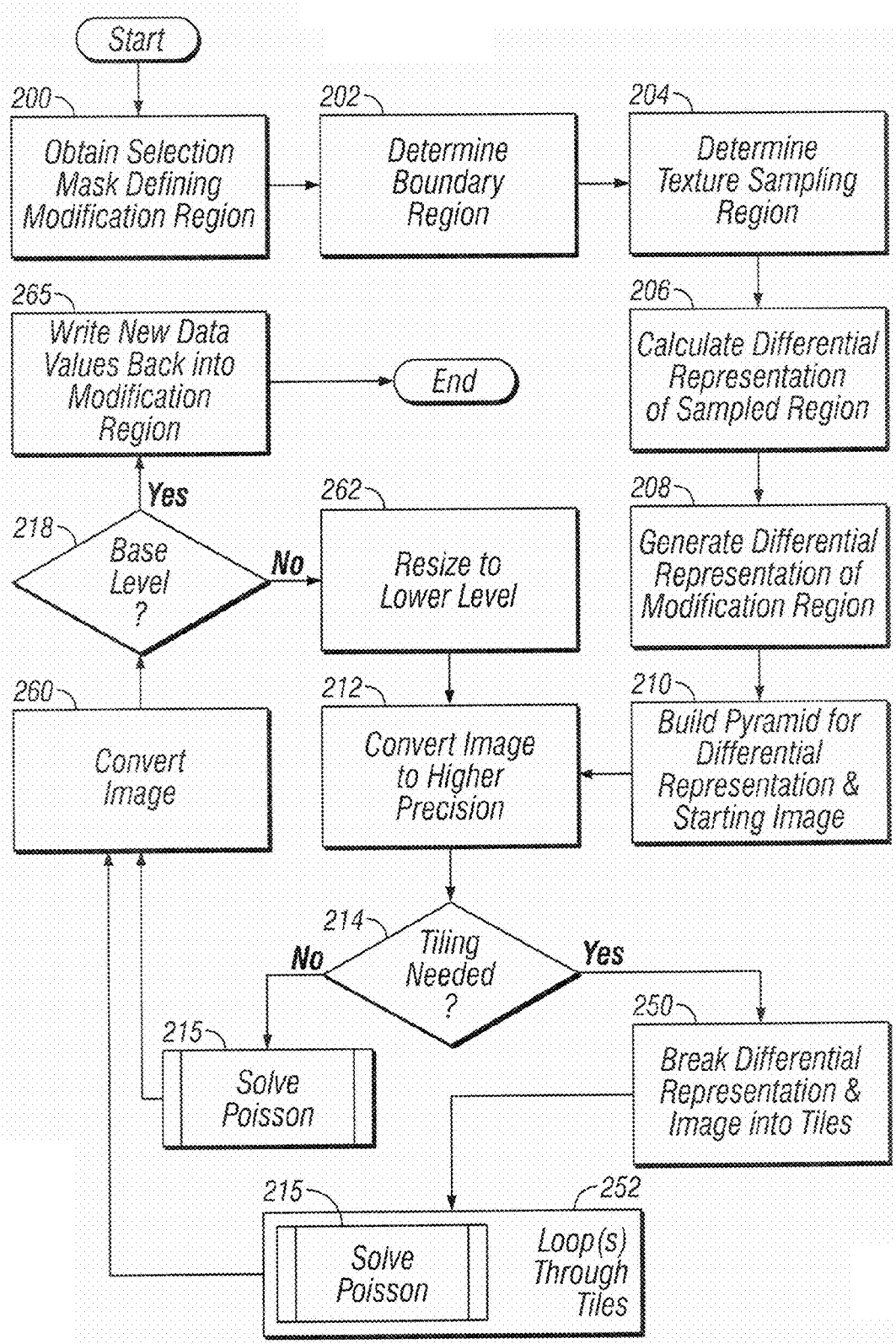
FIG. 2A shows an example process for generating new pixel data values for a region of an image using multi-resolution processing and image tiling.

FIG. 2A shows an example process for generating new pixel data values for a region of an image using multi-resolution processing and image tiling, which optionally can be used to enhance performance. Multi-resolution processing involves generating multiple different resolutions of an image, and then successively processing each different level (from the lowest resolution to the highest resolution) passing information from one processing level down to the next until converging on a final result.

The process begins by obtaining a selection mask defining a modification region of an image (step 200). The selection mask can be obtained manually or automatically as described above. The selection mask identifies which pixels of the image have been selected to be modified, and thus which pixels are included in the region to be healed.

Then, a boundary region is determined for the selected modification region using the selection mask (step 202). Next, a texture-sampling region is determined (step 204), and a differential representation of the boundary region and the texture-sampling region are calculated (step 206). Texture synthesis is performed on the differential representation of the boundary region using samples from the differential representation of the texture-sampling region to generate a differential representation of the modification region (step 208).

Once the differential representation of the modification region is obtained, a process of integrating the modification region differential representation may begin. To initiate the integration process, a pyramid of lower resolution versions of the modification region differential representation is created by resampling the modification region differential representation (step 210). In addition, a pyramid of lower resolution versions of an arbitrary starting image is also created. Each higher level in the pyramid can be 2×2 times smaller in resolution than the previous level. Processing of the pyramid begins at the top (lowest resolution) level. The current level differential representation and the current level starting image are converted to a higher precision value representation (step 212). For example, if the current level is either an 8-bit or 16-bit image (e.g., an RGB image), a value representation greater than 16-bits is used (e.g., a 32-bit fixed point representation, a 32-bit floating point representation, a 32-bit integer representation, etc.). By using a higher precision value representation of the differential pixel data values, changes in pixel values that are smaller than the usual quantum of pixel values can be handled. Negative numbers also can be handled. In some cases, a higher precision value representation may be used for the differential representations of the boundary region and texture sampling region, which allows the differential representations to represent rates of change with more accuracy and to more easily handle negative values.

Next, a check is made to determine if the current level is larger than a predefined maximum size (step 214). If not, control passes to a defined process to modify the current level starting image using the current level differential representation (step 215), which generates new pixel data values for the selected pixels in the current level starting image, to produce a modified image. The modified image is iteratively processed to produce a final modified image. For example, the process shown in FIG. 2B can be used as the defined process in step 215. Otherwise, if the current level is larger than the predefined maximum size, tiling is used. The differential representation of the modification image and the starting image are broken into tiles (step 250). The tiles each include padding to sample from adjacent areas. By breaking the differential representation and the starting image into tiles, modification regions of arbitrarily large size can be processed.

Following tiling, all the tiles for the current level are looped through (i.e., processed sequentially using a pre-defined order) (step 252) using the defined process 215 to modify each image tile. Once all the tiles have been processed, a check is made to determine if additional loops through the tiles are needed. This check may involve analysis of the image (i.e., a convergence test) and/or a count of the number of times the whole image has been processed. Moreover, breaking the image into tiles and looping through the tiles may be combined such that each tile is processed as soon as it is broken out of the image (e.g., loaded into a buffer for processing). Alternatively, an algorithm can check whether padding pixels supplied by a tile to its neighboring tiles have changed, and those neighboring tiles can be added to a work list if the padding pixels have changed, which avoids having to visit all of the tiles if most of the image has already converged (taking round off issues into consideration).

For iterative processing using a kernel, application of a small kernel using multiple iterations through the tiles has a similar effect to applying a very large kernel. By performing multiple loops through the tiles, any visible need for a large amount of padding among tiles can be eliminated. Typically, only two or three loops through all the tiles are sufficient to eliminate any traces of iterative tiled processing.

During subsequent loops through the tiles, various process elements may function differently to improve performance. For example, each subsequent loop through the tiles can involve a different order of looping through the tiles (e.g., a ninety degree rotation between loops (first loop is left to right and top to bottom, second loop is top to bottom and right to left, and so on, or a one hundred and eighty degree rotation between loops).

Once all the loops through the tiles have been performed and the current image level has been fully modified, the current level is converted from the higher precision values back to the appropriate values for the pixel data storage scheme (e.g., 8-bit pixel values) (step 260). A determination is made of whether the base level has been reached (step 218). If not, processing of the next level proceeds. The current level image is resized to the next lower level in the pyramid (step 262). For example, the current level image may be resized by resampling, and data within the selected region is then copied from the resized current level image into the next level to be processed.

Once the base level is reached, the newly generated pixel data vales for the selected region can be written back into the modification region of the original image (step 265). The multi-resolution (or multi-scale) processing depicted in FIG. 2A and described above can improve the speed with which final replacement data values are generated. The lower-resolution versions of the image reach stability rapidly because there are few pixels to heal and the selected region is relatively small. The higher-resolution versions of the image reach stability rapidly because they use the data generated on the prior level and thus start out close to being healed already. The iterations at lower levels of the pyramid fill in detail that can be lost in the downsampling to the next level.

Figure 3A:
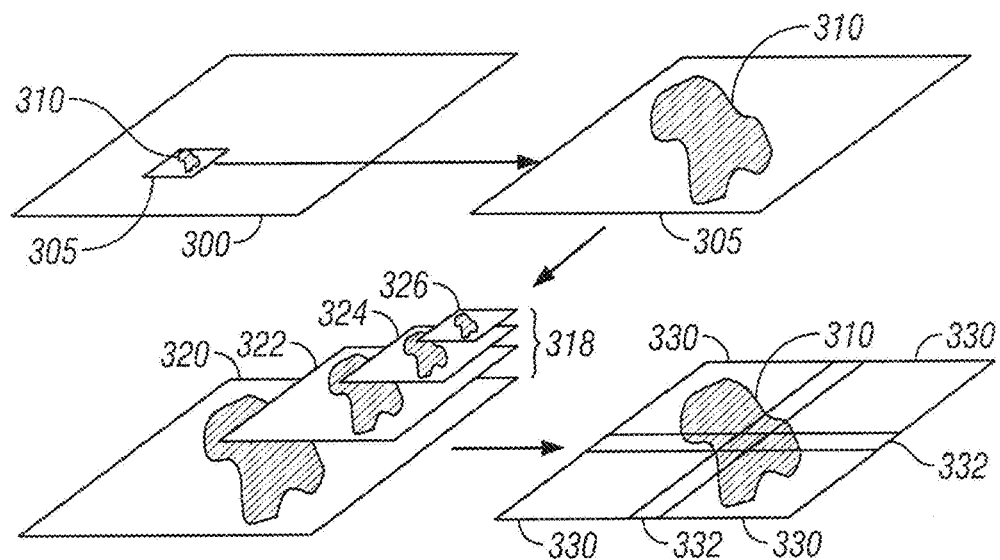
FIG. 3A is a perspective view of an image, a portion of an image, a pyramid of images, and image tiles, illustrating the process of FIG. 2A.

FIG. 3A is a perspective view of an image, a portion of an image, a pyramid of images, and image tiles, illustrating the process of FIG. 2A. An image 300 includes an identified unwanted feature 310, which may be specified by a selection mask (not shown). A portion of the image 300 containing the identified unwanted feature 310 is then identified, such as by determining a bounding box containing the identified unwanted feature 310 to define a modification region 305.

Next, a pyramid 318 of lower resolution versions of the modification region 305 is built, such as a base level 320, a quarter area image 322, a one sixteenth area image 324 and a one sixty fourth area image 326. This pyramid 318 is then processed from the top level 326 to the bottom level 320, the results at each level being resampled to the next lower level before processing of that lower level. Although the pyramid in this illustration depicts an unwanted feature in real image space, the described image healing techniques typically construct a pyramid for an arbitrary starting image that represents different levels of the starting image and a pyramid of differential representations (i.e., in differential space). Each differential representation in the latter pyramid represents a different level of a synthesized differential representation for the modification region.

If any of the image versions 320, 322, 324, 326 are larger than a maximum size, that image version is broken up into tiles with padding. For example, in FIG. 3A, image version 320 (representing the base level of the pyramid 318) is broken up into four tiles 330 with padding 332, which is an overlap region common to adjacent tiles. Then each tile is processed as a separate image.

The amount of padding 332 used typically will depend on the size of the kernel to be applied. For example, the padding 332 may be an amount needed for a current kernel to be applied, or it may be an amount of padding needed for the largest kernel to be applied (e.g., if the largest kernel to be used on the tiles is seven by seven, three pixels of padding are needed around each tile). Application of the kernels and their various sizes is discussed further below.

Figure 2B:
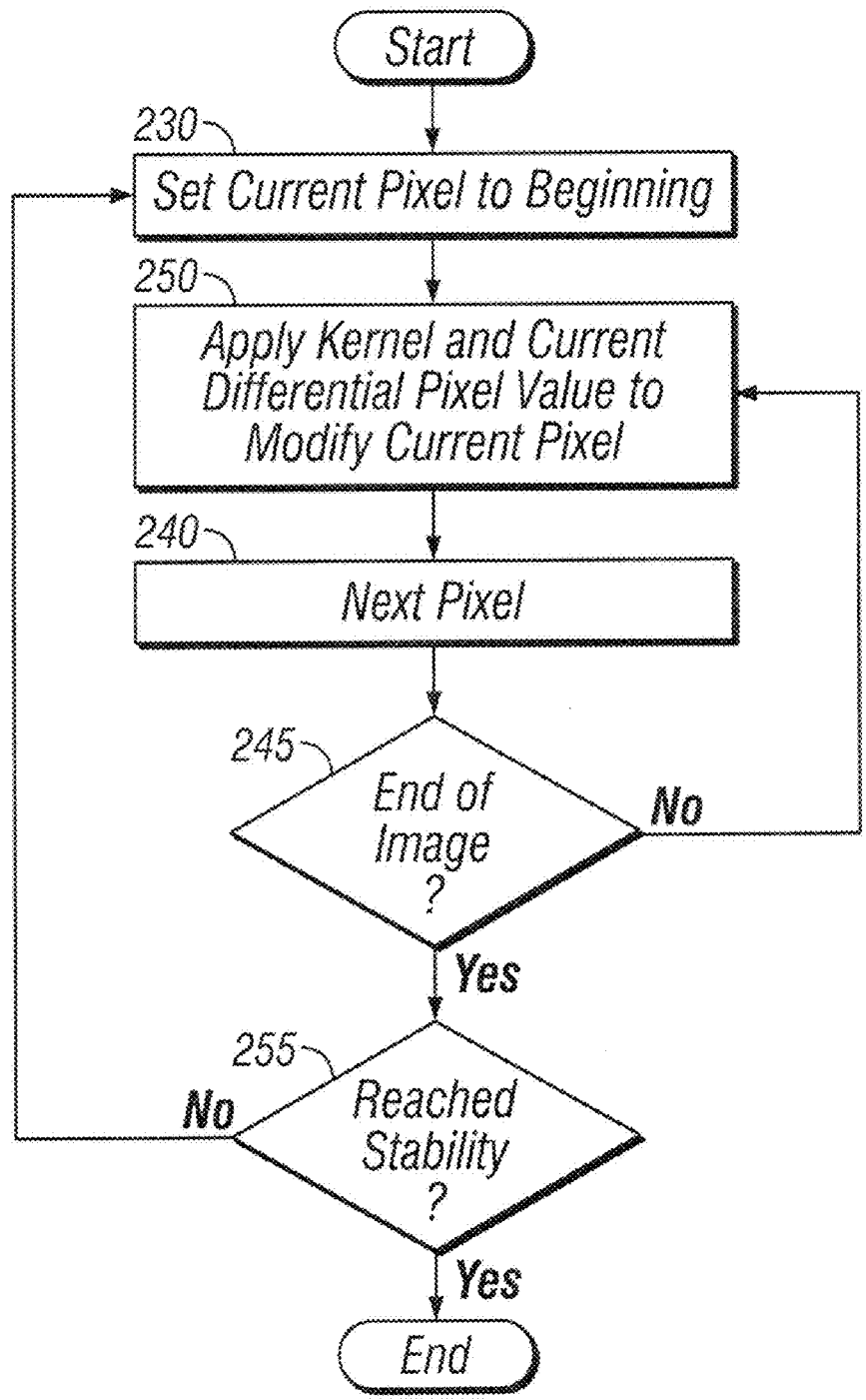
FIG. 2B shows an example process for generating new pixel data values for a modification region of an image at one level, using pixel data values bounding the modification region at that level.

FIG. 2B shows an example process for generating new pixel data values for a modification region of an image at one level, using pixel data values bounding the modification region at that level The process of FIG. 2B can be used as the defined process 215 from FIG. 2A. The process begins by setting a first pixel for the starting image (or, in subsequent processing levels, the modified image for the replacement modification region) as a current pixel to be processed (step 230). The current pixel has a corresponding current differential pixel value in the synthesized differential representation. A kernel and the current differential pixel value are applied to modify the current pixel (step 250). Typically one kernel is applied per pass over the modified image. Then, the next pixel in the modified image becomes the current pixel (step 240). Pixels continue to be checked and processed until the end of the modified image is reached (step 245).

Kernels are only applied to change the values of pixels in the modified image that are within the replacement modification region, although the kernels may use the boundary pixels in calculating the new values. Once the end of the modified image has been reached, a check is made to determine if a state of stability has been reached (step 255). If not, the current pixel is set back to the beginning of the modified image and the modified image is reprocessed. If stability has been reached, the process ends. The values to which the kernel is applied are gradually transformed from arbitrary starting pixel values to fully modified image values through the iterative application of the kernels. Thus, the values start out as arbitrary pixel values but end up as fully modified image values by the time stability is reached.

Determining stability in the image may be accomplished by analyzing recent changes in pixel data values (taking into account the potential for round off error preventing perfect convergence). For example, a maximum pixel change amount may be tracked in each pass through the image. Once the maximum pixel change amount for a complete pass through the image drops below a threshold, a state of relative stability has been reached.

Alternatively, the image is processed a set number of times, possibly using different orientations (i.e., different orderings for the pixels for each pass through the image). For example, the image may be completely looped through one hundred to several hundred times. Or a combination of a counter and stability analysis can be provided.

Figure 3B:
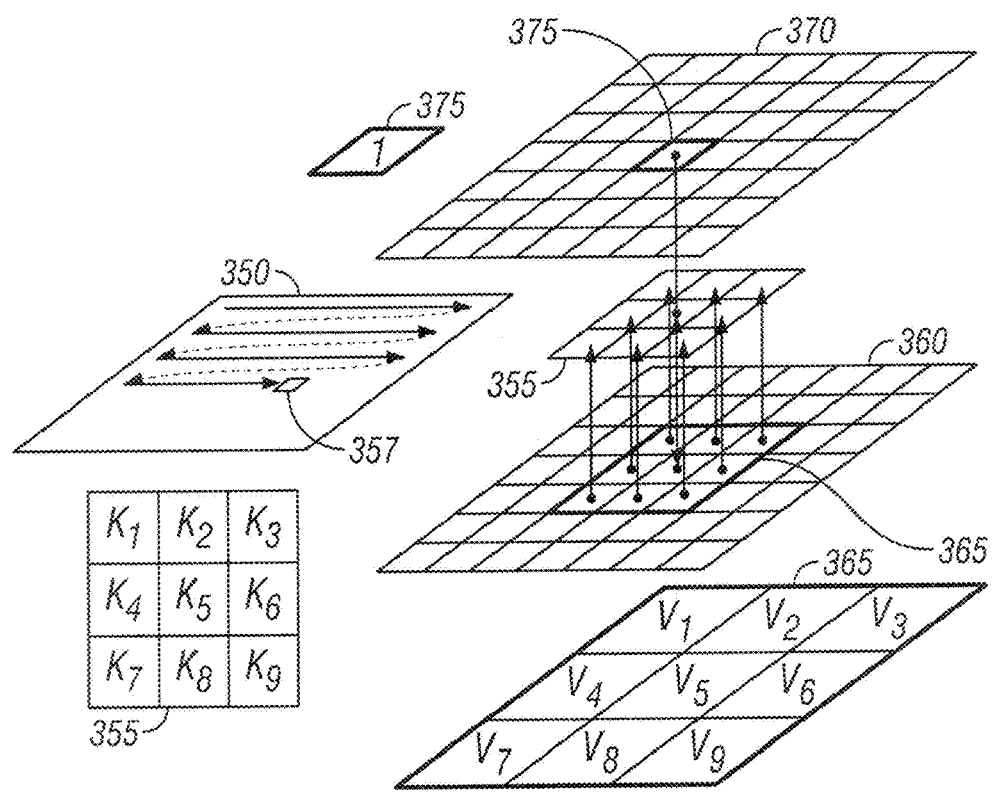
FIG. 3B is a perspective view of an image, a kernel area, a portion of the image, a set of pixels contained in a kernel shadow, and a portion of an image mask, illustrating the process of FIG. 2B.

FIG. 3B is a perspective view of a starting image 350, a kernel area 355, a portion 360 of the starting image 350, a set of pixels contained in a kernel shadow 365, and a portion of an image mask 370, illustrating the process of FIG. 2B. The starting image 350 includes pixels arranged in a rectangle. The pixels may be processed sequentially from left to right and top to bottom. In the case of processing using different orientations for each pass through an image, the image is effectively rotated ninety degrees (or one hundred and eighty degrees) for each complete pass through the image. The image mask 370 may be used to define the modification region (e.g., by having a value of one for every pixel location that is in the modification region and a value of zero for every pixel location that is not in the modification region).

The process of FIG. 2B represents an iterative convolution of a kernel and a differential representation with an image that modifies the image in place. By performing the iterative convolution, the starting image 350 is transformed into the modified image for insertion into the modification region of the original image. A kernel 355 is applied at a current pixel location 357 and modifies the current pixel data based on the current pixel's value, surrounding pixel data values, and a current differential pixel value. For example, the image portion 360 includes pixels and is part of the starting image 350. The image portion 360 has a corresponding image mask portion 370. The current pixel has a corresponding mask location 375 in the image mask portion 370. If the mask location 375 contains a value of one, the current pixel is selected as part of the modification region, and the kernel 355 is applied to the current pixel. If the mask location 375 were to contain a value of zero, indicating that the current pixel is not selected as part of the modification region, the kernel 355 would not be applied.

The kernel 355 represents a mathematical operation that changes the current pixel data value based on the current pixel, the surrounding pixels, and a current differential pixel value. The number of surrounding pixels included by the kernel depends on the size of the kernel and its constants. For example, the kernel 355 has a size of three by three and has constants $K_1, K_2, K_3, K_4, K_5, K_6, K_7, K_8, K_9$. When the kernel 355 is applied at the current pixel, a kernel shadow 365 is defined on the image portion 360, and pixel data values $V_1, V_2, V_3, V_4, V_5, V_6, V_7, V_8, V_9$ from this kernel shadow 365 are used in the calculation of the new pixel data value for the current pixel, according to:

$$V_5 = V_5 + \frac{\sum_{i=1}^{9} K_i \cdot V_i}{KernelDivisor} + D_5$$

where $D_5$ represents the current differential pixel value from the differential representation of the modification region. One or more of the kernel constants $K_1, K_2, K_3, K_4, K_5, K_6, K_7, K_8, K_9$ may be zero. Thus, the particular surrounding pixels that affect the change in the current pixel depend both on the size of the kernel and the constants in the kernel. Techniques similar to those described in connection with FIG. 3B (i.e., without the term $D_5$) may also be used in a single or multiple pass convolution of one or more kernels with an image that modifies the initial image in place to produce a derivative of the source image. Thus, by performing a convolution, the initial image, which represents a source image in real image space, is transformed into a differential representation of the source image.

Figures 4, 7:
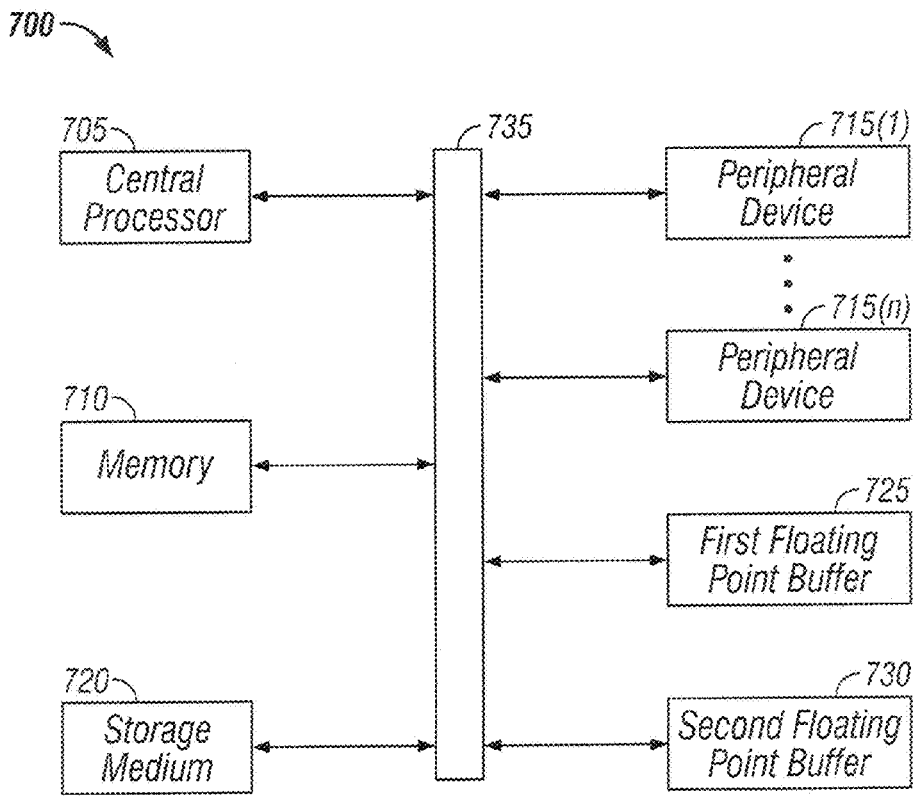
FIG. 4 is an illustration of example kernels for use in calculating derivatives of an image.
FIG. 7 is a block diagram showing an example image healing system.

Many different kernels may be used to generate differential representations of the texture region and/or the boundary region (i.e., source images). FIG. 4 illustrates example kernels for use in calculating derivatives of an image. Two kernels 410, 420 can be used to calculate derivatives. The kernel 410 can be used to calculate a partial derivative with respect to x, and the kernel 420 can be used to calculate a partial derivative with respect to y. These kernels 410, 420 can be used to calculate gradients in the differential representation of a source image (i.e., the texture region and/or the boundary region discussed above). A kernel 430 can be used to calculate a Laplacian in the differential representation of the source image. Other higher order differential representations of the source image can be calculated using a combination of the kernels 410, 420, 430 and/or other kernels.

For example, the kernels may be selected such that their application results in a Laplacian derivative of the texture region and/or the boundary region. Thus, a Laplacian of the source image may be calculated:

$$h(x,y)=\Delta f(x,y),$$

where $\Delta$ is the Laplace operator $$\Delta = \frac{\partial^2}{\partial x^2} + \frac{\partial^2}{\partial y^2}, h(x, y)$$

represents the differential representation of the source image (i.e., the texture region and/or the boundary region), and f(x,y) represents the source image. Texture synthesis, or some other process for filling in the area inside the boundary region with one or more samples from the texture region differential representation, may then be performed in differential space (i.e., using h(x,y)) to produce a differential representation s(x,y) for the modification region.

Many different kernels may also be used to integrate the differential representation for the modification region and thus to generate new pixel data values (i.e., for the modified image) that result in consistent values and consistent change in values at the boundary of the selected modification region. Moreover, multiple kernels may be used to generate new pixel data values that result in multiple orders of consistency at the boundary of the selected region.

For example, the kernels may be selected such that their iterative application results in a solution to a Poisson-type equation, which may be of orders higher than the traditional Poisson equation. Thus, each channel may be a solution of the Poisson equation with given boundary conditions:

$$\Delta g(x,y)=s(x,y),$$

where g(x,y) represents the modified image (e.g., resulting from step 130 of FIG. 1) and s(x,y) is the source term, which represents the differential representation of the modification region (e.g., resulting from step 125 of FIG. 1). The solution is smooth at the boundary. The fourth order equation (or even higher order equations) may also be used:

$$\Delta^2 g(x,y)=s^2(x,y),$$

where $\Delta^2=\Delta\cdot\Delta$ (i.e., Laplacian squared). The processes described above may also be restructured to improve performance. For example, with reference to FIG. 2B, multiple kernels may be used overall but only one kernel at a time at step 250. The process of FIG. 2B may be performed first using a lower order kernel (e.g., a kernel for iteratively solving the second order equation), which generally takes very few iterations to achieve stability. Then, using the result of this first pass as a starting point, the process of FIG. 2B may be performed again using a higher order kernel (e.g., a kernel for iteratively solving the fourth order equation). After this second pass, a yet higher order kernel (e.g., a kernel for iteratively solving the eighth order equation) may be used. Each higher order solution is also a solution of the lower order equation, but not every low order solution is at the same time a high order solution. However, the solutions tend to differ very little, so the above multi-iteration approach to solving higher order equations can greatly speed up convergence.

In generating the modified image from the starting image and the differential representation of the modification region, as discussed above, the type of differential equation to be solved may depend on the type of differential representation selected. For the differential representations of gradient, Laplacian, gradient of the Laplacian, and second Laplacian, the equations to solve are $\Delta f=\nabla s$, $\Delta f=s$, $\Delta\Delta f=\nabla s$, and $\Delta\Delta f=s$. Solving such equations can involve iteratively applying one or more kernels. FIG. 5 illustrates example kernels 510, 520, 530, 540 for use in solving a differential equation. The equations with the Laplacian on the left, $\Delta f=\nabla s$ and $\Delta f=s$, are the Poisson equation, and can be solved as follows. The right hand side is calculated and placed in a buffer as an image r. The kernel 510 is applied to f and r is subtracted.

The result then replaces f, and this process is repeated multiple times (e.g., 100 iterations) to generate the solution. The equations with the Laplacian squared on the left, $\Delta\Delta f=\nabla s$ and $\Delta\Delta f=s$, can be referred to as the Biharmonic Poisson equation. The same iterative process can be used to generate the final solution for this equation, only now using a biharmonic kernel 520. Higher order partial differential equations may be solved using, for example, a triharmonic kernel 530 having kernel constants and a kernel divisor as shown, or a quadraharmonic kernel 540 having kernel constants and a kernel divisor as shown.

When using such kernels, a boundary region can be used. The boundary region generally comes from the original image, although in some cases it may be sufficient for the boundary region to be a duplication of pixels around the texture region image, in which case the boundary region used for solving the Poisson equation may be different than the boundary region used for texture synthesis. The boundary region may be one or more pixel widths depending on the kernels used.

Other kernels are also possible. For example, the kernels selected need not be targeted specifically at preserving differential values to function according to the general approach described here, namely, the iterative application of a function, where values in the boundary region surrounding the modification region in the original image are continuously put back into the calculations so that those values are allowed to propagate into the replacement data values for the modification region. While the initial values of the selected pixel may be used in the computations, these initial contributions are significantly minimized through the iterative process that repeatedly feeds in the values of the boundary pixels back into the iterative recalculation of new values for the selected pixels.

Figure 6:
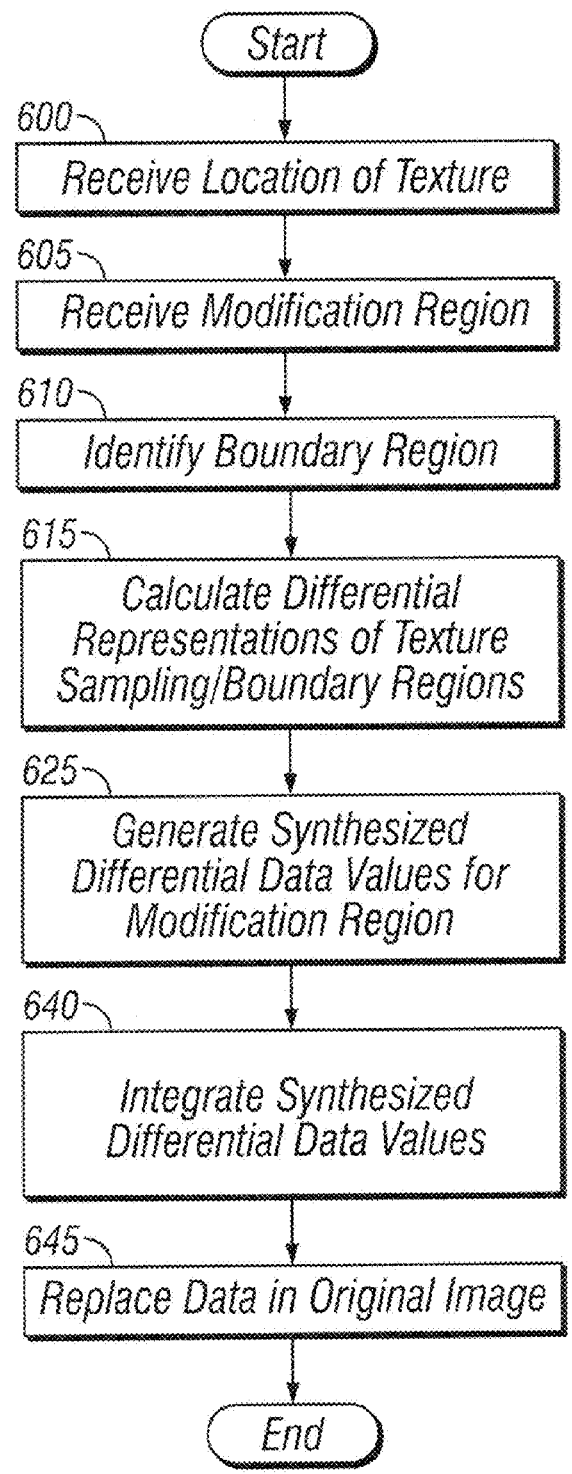
FIG. 6 shows a process for generating new pixel data values for a modification region of an image.

Iteratively applying the one or more kernels can involve converting to a higher precision value representation and using multi-resolution processing and image tiling to enhance performance, as discussed above. Multi-resolution processing can reduce the time needed to reach convergence when iteratively solving a partial differential equation. Image tiling allows images of any size to be processed. When image tiling is used, multi-resolution processing can be very useful in improving time performance. In addition, to using multi-resolution processing for solving a partial differential equation, multi-resolution processing may also be used FIG. 6 shows an example process for generating new pixel data values for a modification region of an image. In addition to the process shown and described, the process of FIG. 6 may also be combined with the tiling and/or the kernel application processes of FIGS. 2A and 2B. Referring now to FIG. 6, the process begins when a user-identified location of a texture-sampling region is received (step 600). The texture sampling region may be an area in the image to be modified or may be in another image. Then, a user-identified modification region is received (step 605). The modification region represents the area to be healed.

A boundary region for the modification region is identified (step 610). The size of the boundary region will depend on the techniques used to generate new pixel data. For example, if the techniques described above are implemented using the biharmonic kernel 520 of FIG. 5, then the boundary region will extend at least two pixels in each direction around the modification region. On the other hand, if the techniques described above are implemented using the quadraharmonic kernel 540 of FIG. 5, then the boundary region will extend at least four pixels in each direction around the modification region.

Next, differential representations of the texture sampling region and the boundary region are calculated (step 615). Then, a texture synthesis algorithm or some other technique is used to generate a synthesized differential representation for the modification region (step 625). The algorithm generates new differential data values for the modification region that result in consistent, or roughly consistent, differential values at the modification region boundary.

For example, each new differential pixel value may be determined by searching for a differential pixel value in the differential representation of the texture-sampling region. The selected differential pixel value may have a neighborhood of surrounding differential pixel values that correlate with a neighborhood of differential pixels that surround the current differential pixel location. This latter neighborhood of differential pixels may include one or both of differential pixels in the differential representation of the boundary region and previously generated new differential pixel values.

The resulting differential representation of the modification region is integrated to produce a modified image (step 640). As before, the values in the synthesized differential representation of the modification region are integrated, such as through an iterative application of one or more kernels, to produce pixel values for the modified image. Then, the new pixel data in the modified image is inserted in the original image in place of the original modification region (step 645).

FIG. 7 is a block diagram showing an example image healing system 700. The system 700 can be a computer running an image processing application, such as PHOTOSHOP® software, and can include an image-generating device, such as a digital camera or scanner. The system 700 can be an image generating device itself, such as a digital camera, and can include a central processor 705, a memory 710 for storing one or more images, and one or more peripheral devices 715(1)-715(n), such as a display monitor for displaying images to a user of the system 700. The peripheral devices 715 may also include a sensor array, which allows a user to capture image data, and other user interface devices, such as a mouse. A storage medium 720 may store instructions for processing images, such as for processing images to heal a region of the image. Communications among the different components may be performed using a data bus 735.

Input from a user can be obtained using a user interface, such as that provided by image processing software, or using a simplified mechanical interface. For example, a mouse may be employed by a user to select one or more areas of an image from which to sample texture and to select an area to be healed. The area to be healed may be in the same or a different image as the texture sampling area(s). The processor 705, using instructions stored in the storage medium 720, may calculate a Laplacian or other derivatives of the texture sampling area and may store the result in a first floating point buffer 725. The processor 705, again using instructions stored in the storage medium 720, may also identify a boundary region (e.g., one or more pixels wide) that surrounds the area to be healed. A Laplacian or other derivatives of the boundary region may be calculated and stored in a second floating point buffer 730. The floating point buffers 725 and 730 may be part of the memory 710 and/or may be contained on the storage medium 720.

The processor 705 may then execute instructions stored on the storage medium 720 to run a texture synthesis algorithm using the values stored in the floating point buffers 725 and 730. In particular, samples of values from the first floating point buffer 725 may be used to fill in an area inside the boundary region to generate synthesized texture. The filled in area may be stored in the second floating point buffer 730 or in a different location. The processor 705 may then solve a Poisson equation using the synthesized texture and an arbitrary starting image to produce replacement pixel values for the area to be healed. For example, the synthesized texture may be used as a right hand side in the Poisson equation and the original boundary region pixel values (not the derivative values stored in the second floating point buffer 730) may be used as Dirichlet boundary conditions. Solving the Poisson equation results in an integration of the synthesized texture. Even if there are discontinuities in the differential representation (i.e., the synthesized texture), the integration removes the discontinuities and creates a consistent function such that colors match at the boundaries. The processor 705 may then insert the replacement pixel values in the area to be healed in the original image to produce a healed image.

The invention can be implemented in digital electronic circuitry, integrated circuitry, or in computer hardware, firmware, software, or in combinations thereof. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software, programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

Figure 8:
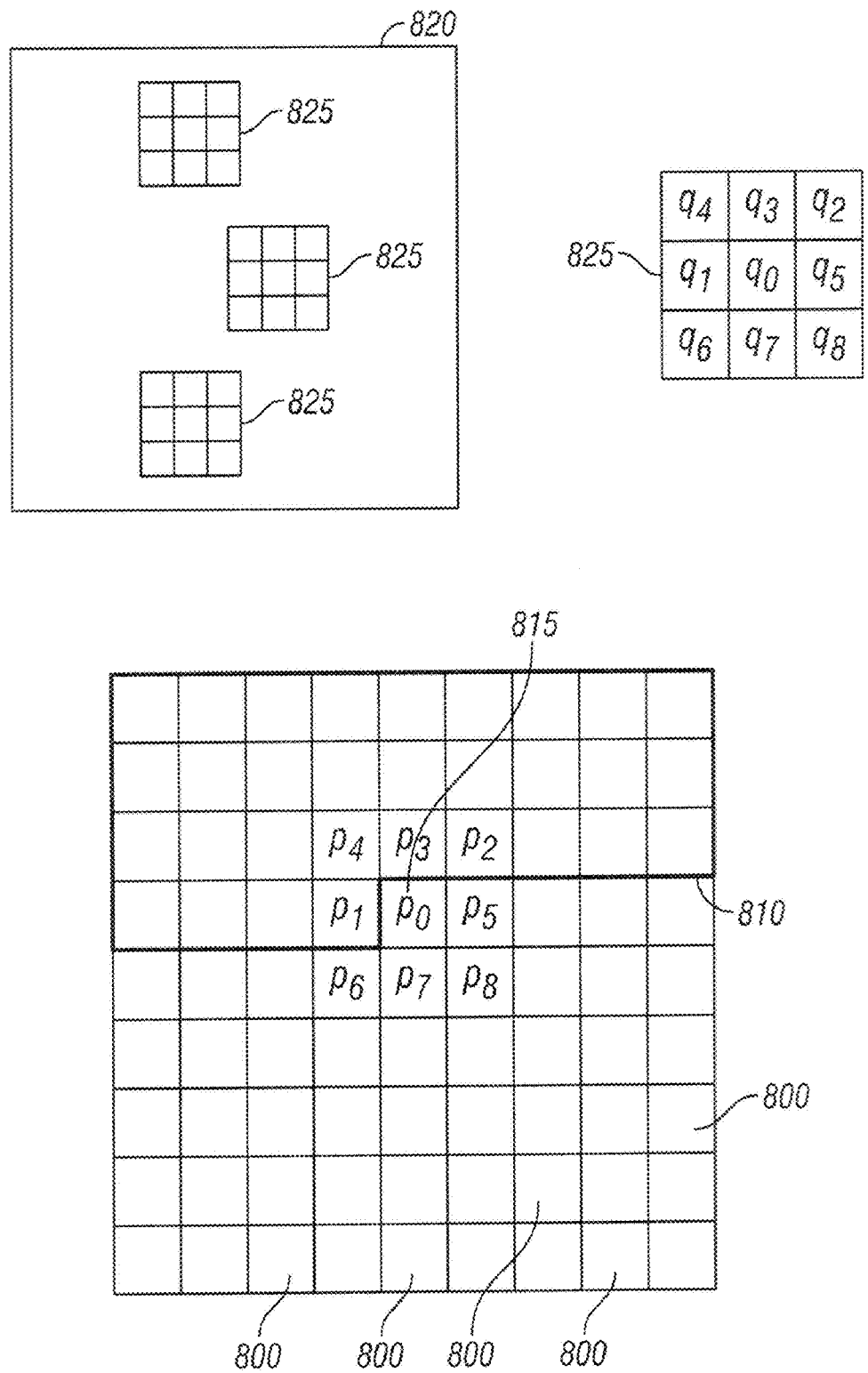
FIG. 8 shows an illustrative example of a texture synthesis process that can be used to synthesize texture in differential space.

FIG. 8 shows an illustrative example of a texture synthesis process that can be used to synthesize texture in differential space. A texture synthesis region 800 may be used to generate a synthesized differential representation of the modification region, as described above. The texture synthesis region 800 may include pixel locations 805 to be filled in with differential pixel values using a texture synthesis algorithm. As the texture synthesis algorithm is executed, a defined value region 810 is generated. The defined value region 810 includes differential pixel values that are assigned either because they represent boundary region differential pixel values or because the differential pixel values have been assigned through a preceding operation of the texture synthesis algorithm. Initially, the defined value region 810 will include only boundary region differential pixel values. Each time the texture synthesis algorithm is used to synthesize a new differential pixel value, the defined value region 810 grows in size by one pixel.

Using the defined value region 810, the texture synthesis algorithm operates to assign a value to a current differential pixel location 815. The differential pixel value $p_0$ may be assigned by correlating a neighborhood of differential pixel values (e.g., $p_i$ for i=1 to n) with multiple candidate neighborhoods 825 of differential pixel values (e.g., $q_i$ for i=1 to n) in a texture sampling region 820 and selecting a sampled differential pixel value $q_0$ for which the correlation $$\left(\text{e.g., } R = \sum_{i=1}^{n} (p_i - q_i)^2\right)$$

between the current neighborhood and the candidate neighborhood is minimized.

In some implementations, the neighborhoods used in calculating the correlations may be limited to portions of the defined value region 810 (e.g., n=4 in the illustrated example) because neighboring differential pixel locations that do not have an assigned value may make an undesirable contribution to the correlation. In other implementations, portions of the neighborhood in the texture synthesis region 800 that are not in the defined value region 810 may be used in the correlation (e.g., n=8 in the illustrated example), such as when the undefined portions have a tentative value as determined by a lower resolution texture synthesis level. Such a tentative value may be determined by the resampling or resizing at step 635. The tentative values (e.g., $p_i$ for i=5 to 8) may be given the same weight as the defined values (e.g., $p_i$ for i=1 to 4) or a more complex weighting algorithm (e.g., that gives more weight to the defined values than the tentative values) may be used. Although a 3×3 neighborhood is illustrated, other neighborhood sizes may be used. The size of the neighborhood may be predetermined, may be selected by performing some type of analysis of the texture, and/or may be adjusted by the user.

Once the differential pixel value $p_0$ is assigned, the current differential pixel location 815 becomes part of the defined value region 810, and the texture synthesis moves to the next differential pixel location (e.g., the differential pixel location with an illustrated value of $p_5$ becomes the next current differential pixel location). The process of FIG. 8 is repeated for the new differential pixel location and continues for each subsequent differential pixel location. Once the end of the texture synthesis region 800 is reached, the texture synthesis region 800 may be resampled or resized if multi-resolution processing is used, or the texture synthesis region 800 may be integrated if the final level has been reached or if multi-resolution processing is not used. As an alternative to using multi-resolution processing for texture synthesis, a relatively large neighborhood size may be used to achieve similar results.

Although the above example illustrates a texture synthesis technique in which differential pixels are synthesized one by one, another possible implementation may involve assigning multiple differential pixels at a time. For example, correlations may be performed using neighborhoods of a group of differential pixels instead of neighborhoods of a single differential pixel. Because texture synthesis is performed in a differential space, the use of relatively large groups of differential pixels during the texture synthesis process may not have a noticeable effect on the image that results after integration. The grouping of differential pixels for performing texture synthesis and the sizing of the groups may be predetermined, may be selected by performing some type of analysis of the texture, and/or may be selected and adjusted by the user.

Figure 9A:
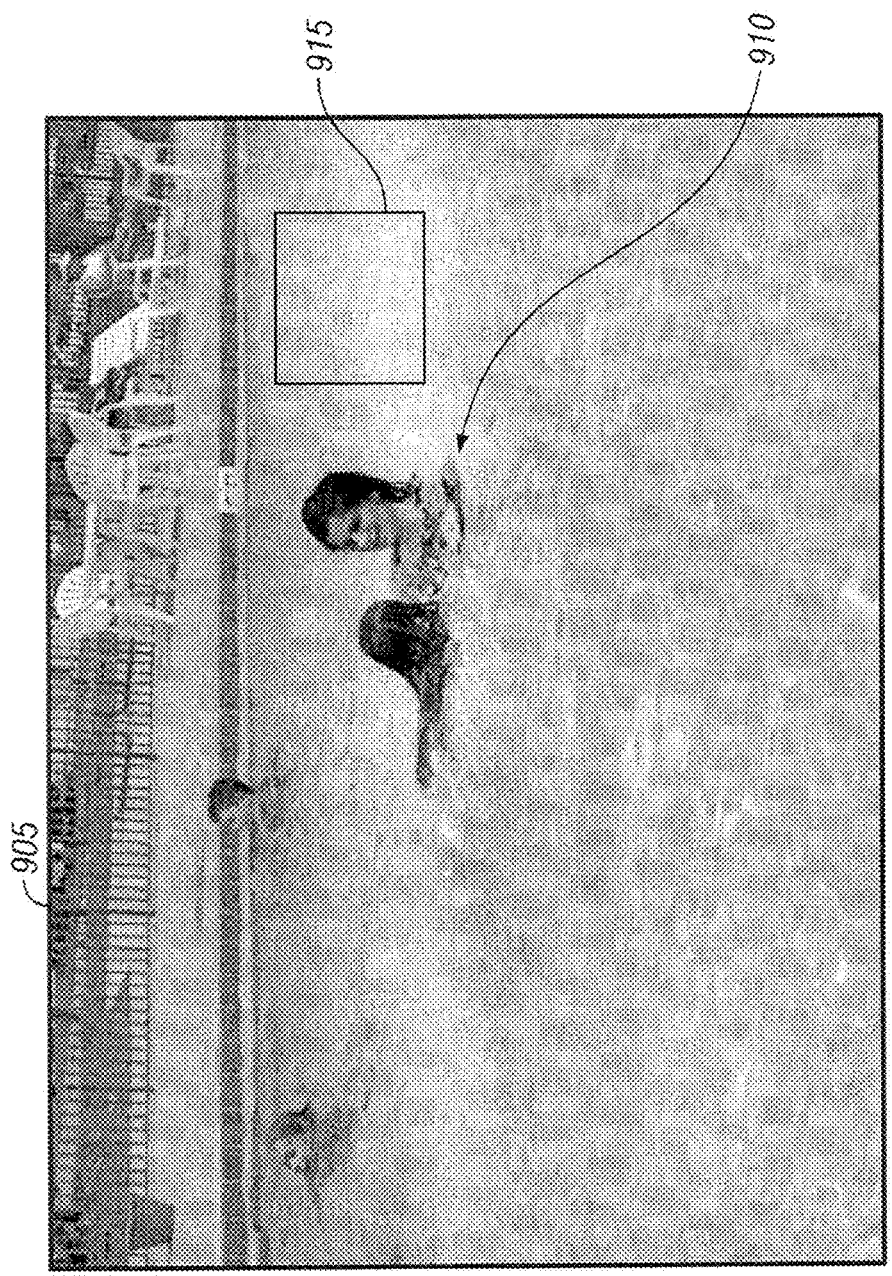
FIGS. 9A, 9B, and 9C show an illustrative example of an image being modified using the process of FIG. 1.
Figure 9B:
Figure 9C:
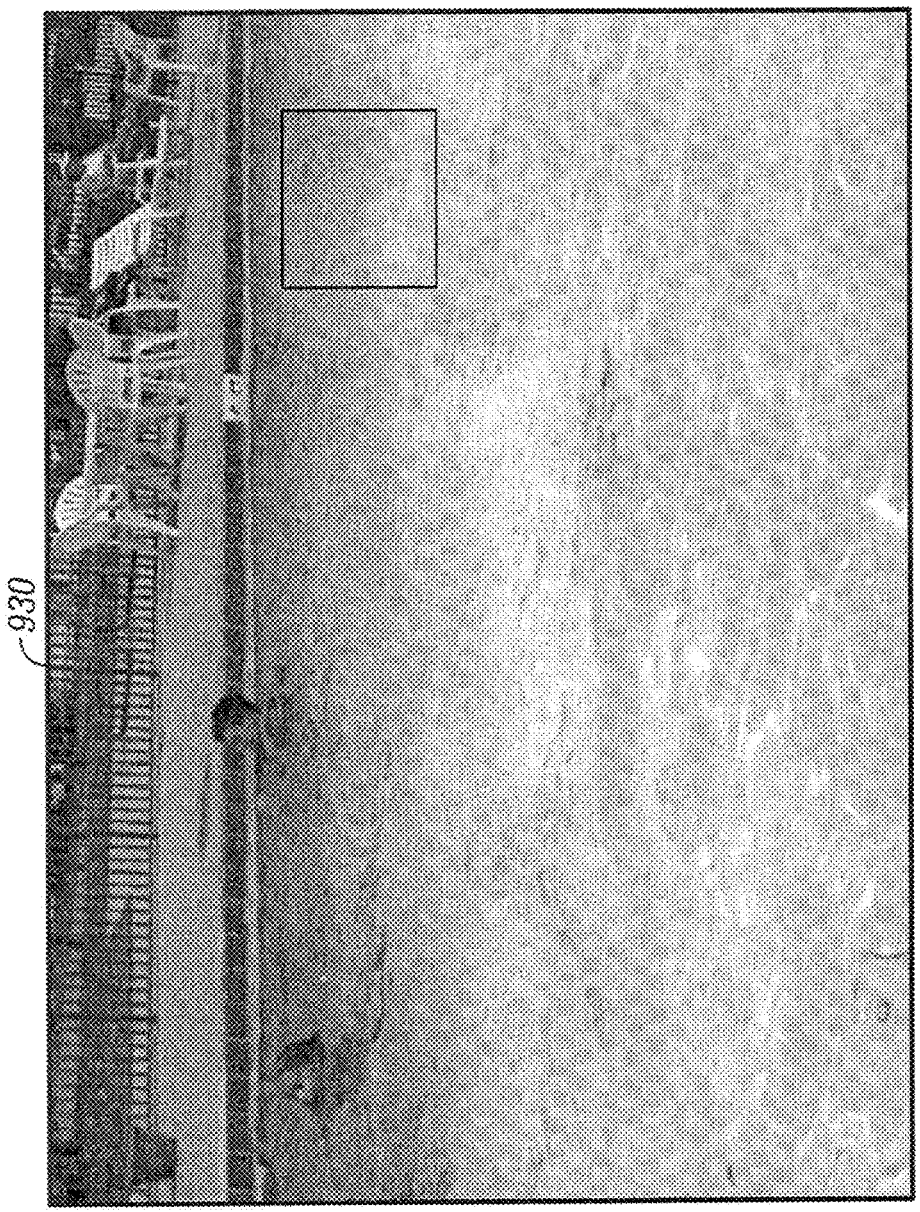

FIGS. 9A, 9B, and 9C show an illustrative example of an image being modified using the process of FIG. 1. Referring now to FIG. 9A, an image 905 is presented as part of a graphical user interface (not explicitly shown) for enabling modification of the image 905 in accordance with the process of FIG. 1. The image 905 includes an unwanted feature in a modification region 910. In this example, the unwanted feature is an image of two people in the middle of a pool. The image 905 also includes a texture sample region 915, which may be selected by the user. Typically, the user can decide what area of texture best approximates the type of texture that should be inserted into the modification region 910. If no such best approximation exists, a user may also specify a texture source that lies in a separate image. A Laplacian of the texture sample region 915 and a Laplacian of a boundary region for a modification region of the image 905 are calculated. In this example, a Laplacian differential representation of the entire image 905 is calculated, and a differential representation of the texture sample region 915 is obtained from the differential representation of the entire image 905.

FIG. 9B shows an image 920 that provides a visual representation of a Laplacian of the original image 905, including a (Laplacian) differential representation 925 of the texture sample region 915. In this illustrated example, the differential representation 925 of the texture sample has been copied multiple times to different areas to cover the area corresponding to the modification region 910 shown in FIG. 9A. Because the copies are made in differential space, the boundaries of the copied samples tend to blend well with the adjacent differential values.

In this example, the entire differential representation 925 of the texture sample region 915 is used as a single grouping to provide a large-scale differential representation 925 of the texture sample. Furthermore, the differential representation 925 of the texture sample region 915 is copied without performing any automated matching at the boundaries (although a user may manually select a texture region that tends to match the texture at the boundaries of the modification region). Thus, the illustrated example does not use texture synthesis. As will be recognized, the resulting image may be improved by using smaller samples from the texture sample differential representation and/or by matching the samples to the boundary region differential representation through the use of a texture synthesis algorithm. In one possible implementation, the differential representation 925 of the texture sample region 915 may be subdivided into ten or twenty different subsamples. In addition, additional subsamples may be derived from other portions of the differential representation of the entire image 905. The so neighborhood of each subsample may be correlated with the neighborhood of a current location in the differential representation of the modification region 910 to identify a best match. A copy of the subsample that corresponds to the best match may then be inserted in the current location, and this process may be repeated until the entire differential representation of the modification region 910 is filled in.

Once the differential representation of the modification region 910 has been filled in, an integration operation is performed (e.g., solving a Poisson equation) to generate new pixel data for the modification region 910. The integration operation generally needs to be performed only on the differential representation of the modification region 910. The pixel data from the original image 905 may be used to provide pixel values for all other portions of the new image (and to provide boundary conditions for the integration operation). It is also possible, however, to perform the integration operation on a modified differential representation of the entire or substantially the entire image 905 (as shown in FIG. 9B).

FIG. 9C shows a new image 930 that results from the integration operation. The new image 930 replaces the unwanted feature of the original image 905 with a texture that is relatively consistent at the boundaries of the modification region 910. Moreover, by performing the texture substitution in differential space and integrating the result, the color (grayscale, in this case) is consistent at the boundaries of the modification region 910. Although the illustrated examples are shown in grayscale, the same operations may be performed on color images by, for example, separating the original image into separate RGB components and using the described techniques on each of the separate components before combining the results into a single modified image.

FIG. 10 shows an illustrative example of a modified image 1005, somewhat analogous to that of FIG. 9C, but modified according to conventional techniques. In particular, the modified image 1005 is produced from the original image 905 shown in FIG. 9A by copying the texture sample region 915 multiple times to different areas (as shown at 1010) to cover the modification region 910 shown in FIG. 9A. The modified image 1005 includes relatively consistent texture at the boundaries of the copied texture samples. Unlike the new image 930 shown in FIG. 9C, however, the modified image 1005 has noticeable differences in grayscale pixel values at the boundaries of the copied texture samples. Such noticeable discontinuities at the boundaries are avoided in accordance with the techniques described above by generating texture for a region to be healed in differential space and integrating the resulting differential representation to obtain an image that is consistent with the boundary conditions.

A number of implementations have been described. Nevertheless, it will be understood that various modifications may be made. For example, the logic flows depicted in FIGS. 1, 2A, 2B, and 6 do not require the particular order shown. In certain implementations, multi-tasking and parallel processing may be preferable. In addition, although texture is described as being generated in differential space using texture synthesis algorithms, other processes for generating texture in differential space may also be used. Accordingly, other implementations are within the scope of the following claims.

What is claimed is:

1. A computer-implemented method for generating a portion of an image, the method comprising using a computer to perform the following actions:
   receiving an identification of an image texture region stored in a computer storage device;
   calculating a differential representation for pixels in the image texture region, wherein the differential representation represents a rate of change between pixels across the image texture region;
   generating a synthesized differential representation of a new texture region by sampling differential representations of pixels in the image texture region; and
   generating the new texture region based on the synthesized differential representation, wherein the new texture region includes a plurality of pixels stored in a computer storage device.

2. The method of claim 1, wherein generating the new texture region based on the synthesized differential representation includes integrating the synthesized differential representation.

3. The method of claim 1, wherein generating the new texture region based on the synthesized differential representation includes solving a partial differential equation.

4. The method of claim 3, further comprising the following actions:
   identifying boundary pixels for the new texture region; and
   using the boundary pixels to provide boundary conditions for solving the partial differential equation.

5. The method of claim 4, further comprising the following action:
   inserting the new texture region in an original image that includes the boundary pixels to generate a modified image.

6. The method of claim 4, further comprising the following actions:
   calculating a differential representation of the boundary pixels, wherein generating the synthesized differential representation of the new texture region by sampling differential representations of pixels in the image texture region includes performing texture synthesis to obtain a substantially consistent texture between the differential representation of the boundary pixels and the synthesized different representation of the new texture region.

7. An article comprising a non-transitory computer-readable storage medium storing instructions for causing one or more processors to perform operations including:
   using one or more processors to calculate a differential representation for an image texture region, wherein the differential representation represents a rate of change between pixels across the image texture region;
   using one or more processors to generate a synthesized differential representation of a new texture region using the differential representation of the image texture region; and
   using one or more processors to generate the new texture region based on an integration of the synthesized differential representation.

8. The article of claim 7, wherein the non-transitory computer-readable storage medium stores instructions for causing one or more processors to further perform operations including:
   receiving an identification of the image texture region; and
   storing the differential representation of the image texture region in a first buffer.

9. The article of claim 8, wherein the non-transitory computer-readable storage medium stores instructions for causing one or more processors to further perform operations including:
   receiving an identification of a region to be modified in an original image;
   identifying a boundary region for the region to be modified in the original image;
   using one or more processors to calculate a differential representation for the boundary region; and
   storing the differential representation of the boundary region in a second buffer, wherein generating the synthesized differential representation of the new texture region includes performing texture synthesis using the differential representation of the image texture region to obtain substantially consistent texture between the differential representation of the boundary region and the synthesized differential representation of the new texture region.

10. The article of claim 9, wherein the non-transitory computer-readable storage medium stores instructions for causing one or more processors to further perform operations including:
    inserting the new texture region in the original image in place of the region to be modified.

11. The article of claim 9, wherein the new texture region is generated based on an integration of the synthesized differential representation includes solving a partial differential equation using the differential representation of the boundary region as a boundary condition.

12. The article of claim 7, wherein using one or more processors to generate the new texture region based on an integration of the synthesized differential representation includes solving a partial differential equation having predefined boundary conditions.

13. The article of claim 12, wherein the predefined boundary conditions are derived from pixels of an original image stored in a computer storage device.

14. A system comprising:
    at least one memory adapted to store at least one of image data or instructions for processing image data;
    at least one processor configured to:
       calculate a differential representation for an image texture region, wherein the differential representation represents a rate of change between pixels across the image texture region;
       generate a synthesized differential representation of a new texture region using the differential representation of the image texture region; and
       generate the new texture region based on an integration of the synthesized differential representation.

15. The system of claim 14, wherein the at least one processor is further configured to identify a boundary region for a region of an original image to be modified, wherein the new texture region is generated based on an integration of the synthesized differential representation using the boundary region to provide boundary conditions for the integration.

16. The system of claim 15, wherein the at least one processor is further configured to:
    store the differential representation of the image texture region in at least one memory;
    calculate a differential representation for the boundary region; and
    store the differential representation of the boundary region in at least one memory, wherein the synthesized differential representation of the new texture region is generated by performing texture synthesis using the differential representation of the image texture region to obtain substantially consistent texture between the differential representation of the boundary region and the synthesized differential representation of the new texture region.

17. The system of claim 15, wherein the at least one processor is further configured to:
    generate a modified image by replacing the region of the original image to be modified with the new texture region; and
    store the modified image in a computer storage device.

18. An article comprising a non-transitory computer-readable storage medium storing instructions for causing one or more processors to perform operations comprising:
    receiving an identification of a modification region in an original image;
    determining a boundary region in the original image, wherein the boundary region is adjacent to the modification region;
    performing texture synthesis in differential space using the boundary region to produce a synthesized differential representation for the modification region, wherein the differential space includes data representing a rate of change between pixels across the synthesized differential representation for the modification region; and
    integrating the synthesized differential representation to generate a modified image.

19. The article of claim 18, wherein integrating the synthesized differential representation comprises calculating a solution to a partial differential equation having a source term corresponding to the synthesized differential representation.

20. The article of claim 19 wherein performing texture synthesis in differential space includes:
    calculating a derivative of the boundary region to produce differential boundary pixel values;
    calculating a derivative of a texture region to produce differential texture pixel values; and
    selecting samples of the differential texture pixel values for use in generating the synthesized differential representation.

21. The article of claim 18 wherein performing texture synthesis includes selecting samples from a texture image that match the boundary region in differential space.

22. A system comprising:
 at least one memory adapted to store at least one of image data or instructions for processing image data;
 at least one processor configured to:
  receive an identification of a modification region in an original image;
  determine a boundary region in the original image, wherein the boundary region is adjacent to the modification region;
  perform texture synthesis in differential space using the boundary region to produce a synthesized differential representation for the modification region, wherein the differential space includes data representing a rate of change between pixels across the synthesized differential representation for the modification region; and
  integrate the synthesized differential representation to generate a modified image.

23. The system of claim 22, wherein the at least one processor is further configured to store the modified image in a computer storage device.

24. The system of claim 22, wherein the at least one processor is further configured to integrate the synthesized differential representation by calculating a solution to a partial differential equation using the synthesized differential representation as a boundary condition.

25. The system of claim 24, wherein the at least one processor is further configured to perform texture synthesis by selecting samples from a texture image that match the boundary region in differential space.

* * * * *